United States Patent
Veerepalli et al.

(10) Patent No.: US 6,990,330 B2
(45) Date of Patent: Jan. 24, 2006

(54) METHOD AND APPARATUS PROVIDING USER WITH ACCOUNT BALANCE NOTIFICATION OF PREPAID WIRELESS PACKET DATA SERVICES

(75) Inventors: Sivaramakrishna Veerepalli, San Diego, CA (US); Jun Wang, La Jolla, CA (US); Arungundram C. Mahendran, San Diego, CA (US); Raymond T. Hsu, San Diego, CA (US); Sanjeev Arvind Athalye, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 164 days.

(21) Appl. No.: 10/340,136

(22) Filed: Jan. 9, 2003

(65) Prior Publication Data

US 2004/0137874 A1    Jul. 15, 2004

(51) Int. Cl.
*H04Q 7/20* (2006.01)
(52) U.S. Cl. .................................. 455/406; 455/405
(58) Field of Classification Search ............. 455/405, 455/406, 410, 411, 408, 407, 412.2, 558, 455/567; 370/352–354, 395.52; 705/39–40; 235/379–382
See application file for complete search history.

(56) References Cited

U.S. PATENT DOCUMENTS

| | | | |
|---|---|---|---|
| 6,493,547 B1 * | 12/2002 | Raith | 455/405 |
| 6,496,690 B1 | 12/2002 | Cobo et al. | |
| 6,796,491 B2 * | 9/2004 | Nakajima | 235/379 |
| 2002/0068565 A1 * | 6/2002 | Purnadi et al. | 455/436 |
| 2002/0115424 A1 * | 8/2002 | Bagoren et al. | 455/408 |
| 2002/0133457 A1 * | 9/2002 | Gerlach et al. | 705/39 |
| 2002/0159442 A1 * | 10/2002 | Quigley et al. | 370/352 |
| 2003/0045266 A1 * | 3/2003 | Staskal et al. | 455/405 |

* cited by examiner

*Primary Examiner*—Jean Gelin
(74) *Attorney, Agent, or Firm*—Philip R. Wadsworth; Thien T. Nguyen; George J. Oehlin

(57) ABSTRACT

A wireless packet data network (120) provides subscriber stations 114 with account balance notification concerning prepaid wireless packet data services. The network (120) detects (404, 406) occurrence of predefined trigger events. Responsive to occurrence of any one of these predefined trigger events in conjunction with a prepaid wireless packet data subscriber station (114), the network (146) sends (408) a balance notification to the subscriber station (114).

15 Claims, 10 Drawing Sheets

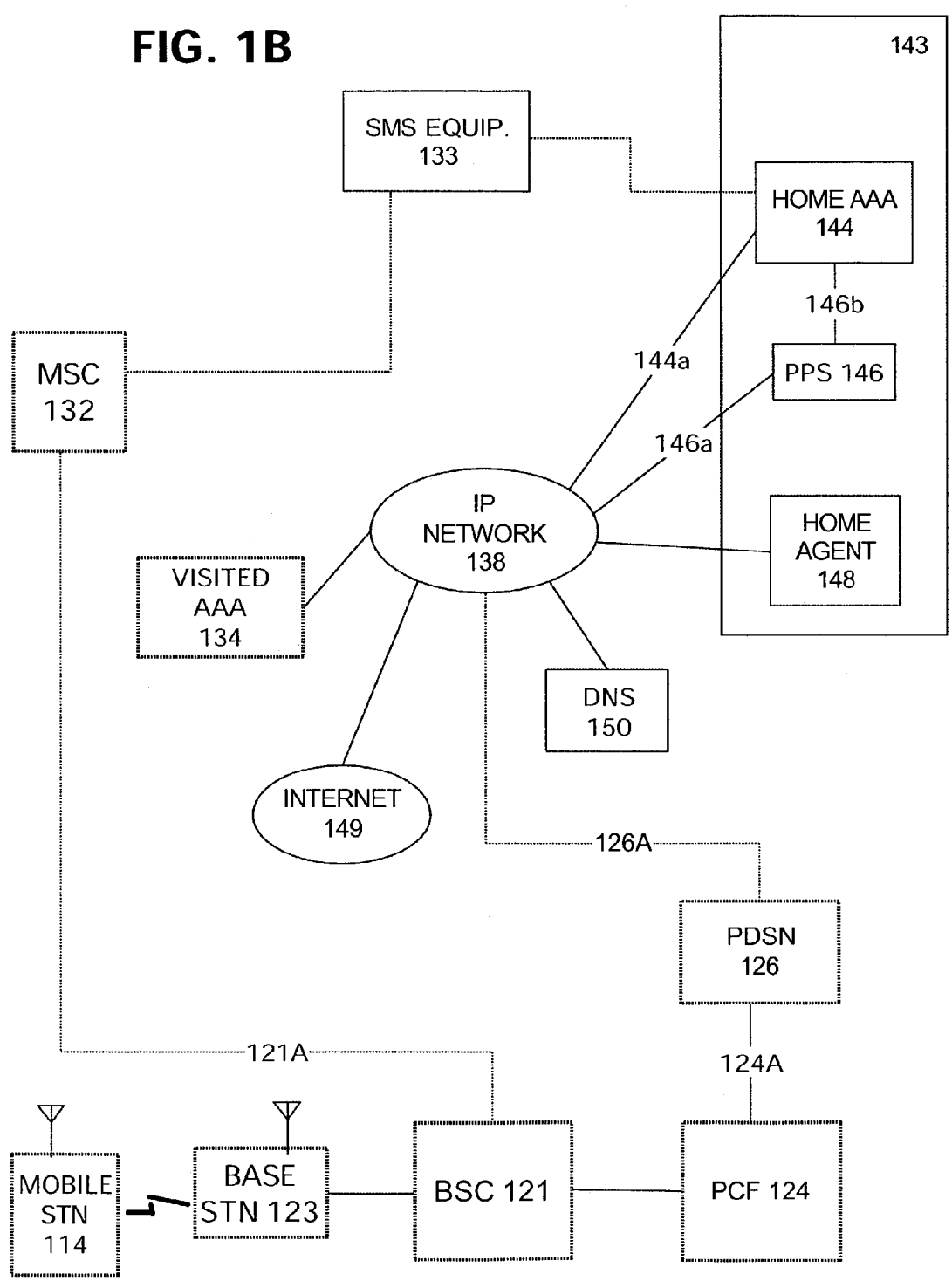

BALANCE NOTIFICATION
VIA NETWORK-SPECIFIC
SIGNALLING

BALANCE NOTIFICATION
VIA SMS

BALANCE NOTIFICATION
VIA APPLICATION/IP

BALANCE QUERY
VIA NETWORK-SPECIFIC
SIGNALING

BALANCE QUERY
VIA SMS

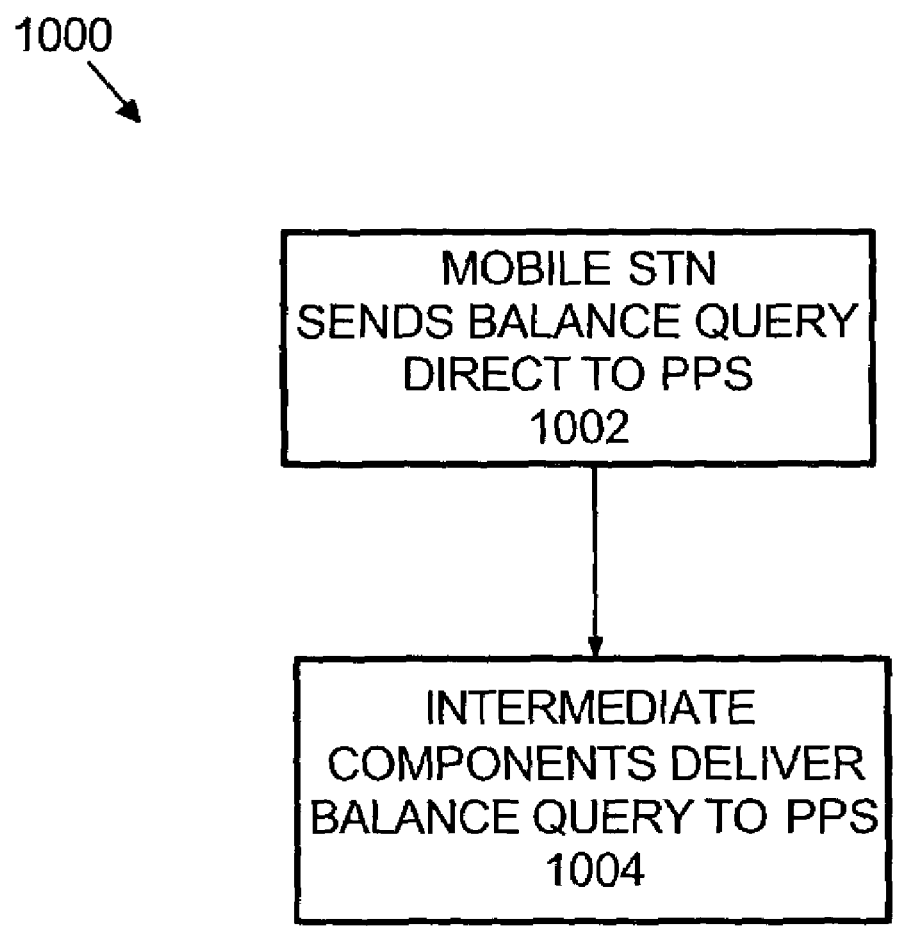

METHOD AND APPARATUS PROVIDING USER WITH ACCOUNT BALANCE NOTIFICATION OF PREPAID WIRELESS PACKET DATA SERVICES

BACKGROUND

1. Field

The present invention generally relates to prepaid wireless packet data services. More particularly, the invention concerns various embodiments of apparatus and method to provide users with balance notification concerning their prepaid wireless packet data accounts.

2. Background

Pre-paid wireless voice communications services have been available to consumers for some time. In a typical case, a subscriber prepays for future voice calls conducted by the subscriber's wireless phone. The subscriber expends her prepaid funds as she utilizes the network to conduct wireless voice calls.

For some time now, wireless communications networks have been undergoing revisions to enable wireless packet data services, that is, the relay of electronic communications such as e-mail, web browsing, and other non-voice related services. As for CDMA-2000 networks, recent proposals add the functionality of prepaid wireless packet data services, similar to the traditional prepaid voice services. In this regards, one proposed standard for prepaid wireless packet data services is the "CDMA2000 Wireless IP Network Standard," known as Telecommunications Industry Association (TIA) IS-835-C. Chapter 5, which pertains to prepaid service, is attached as an appendix hereto. Other references address the use of prepaid packet data services in other network types, such as U.S. Pat. No. 6,496,690 as applied to general packet radio service (GPRS) networks. The entirety of this patent is incorporated herein by reference.

Under the state of the art as described by these and other references, once the subscriber pays to establish an account balance, she is allowed to use the packet data service until the account balance reaches zero. When the account balance reaches zero, the network disconnects service until the user replenishes the prepaid account balance. From the user's standpoint, this can be frustrating because there is no reliable warning or other indication of impending service loss.

SUMMARY

The present invention concerns a method and apparatus to provide subscribers with account balance notification concerning prepaid wireless packet data services in a wireless packet data network. The network detects occurrence of predefined trigger events. Responsive to occurrence of any one of these predefined trigger events in conjunction with a prepaid wireless packet data subscriber station, the network sends a balance notification to the subscriber station.

Under one embodiment, some exemplary predefined trigger events include: a subscriber station's account balance falling below a network-specified threshold, a subscriber station's account balance falling below a user-specified threshold, receiving an account balance query from a subscriber station, receiving an account balance query from a prepaid client, replenishment of account balance, and/or arrival of a prescribed time. The balance notification may be delivered in various ways, for example, communications utilizing network-architecture-specific (NAS) signaling, short messaging service (SMS), or application/internet protocol (IP).

BRIEF DESCRIPTION OF THE DRAWINGS

FIG. 1B is a more detailed block diagram showing some packet data related hardware components and interconnections specific to CDMA-2000.

FIG. 10 is a more detailed flowchart illustrating a sequence for subscriber station submission of a balance query utilizing application/IP communications.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

As mentioned above, the present disclosure concerns various embodiments of apparatus and method to provide subscribers with balance notification concerning their prepaid wireless packet data services account. This disclosure is illustrated in the context of an exemplary wireless packet data network, which includes various components as specifically described below.

Figure 1A:
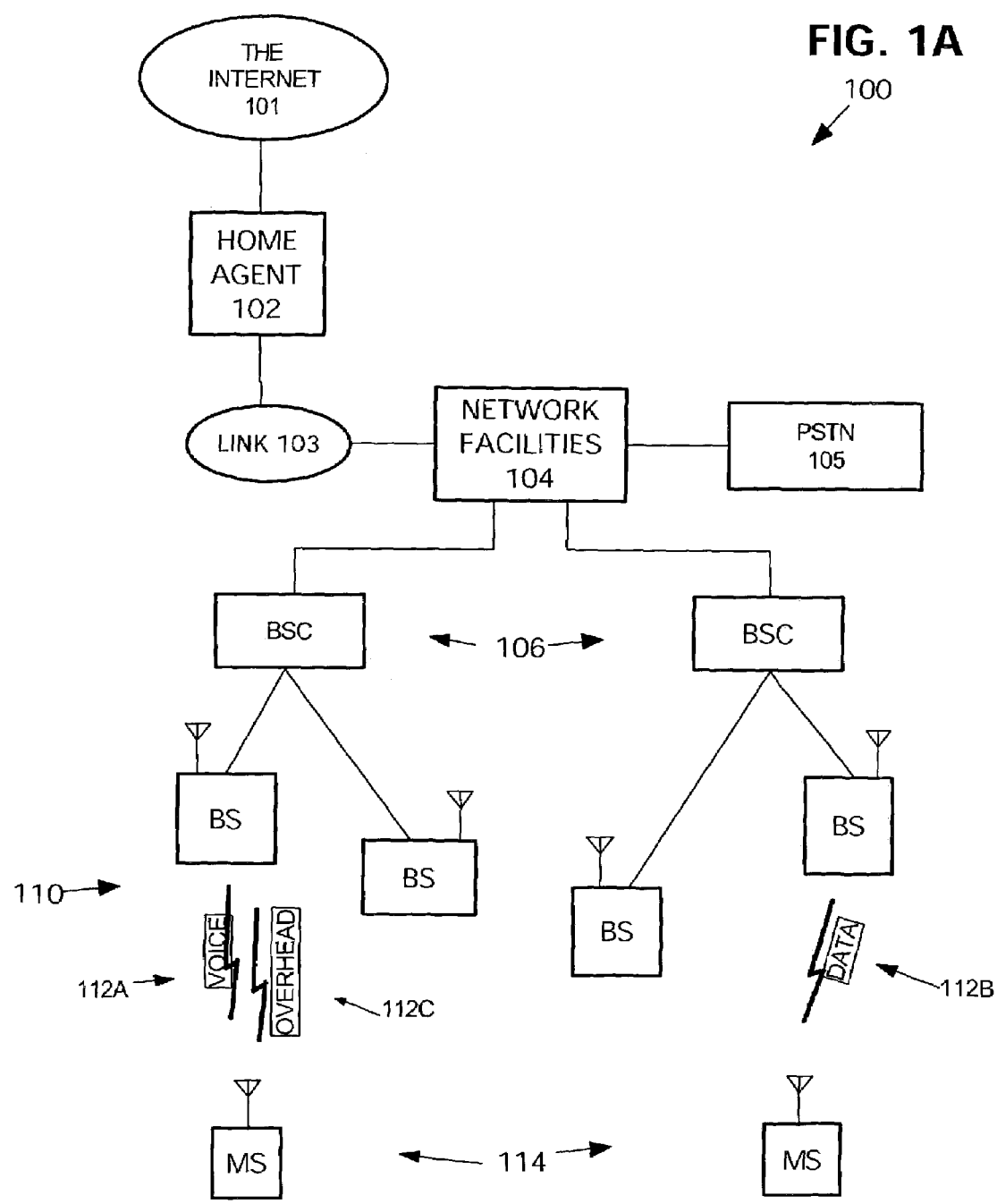
FIG. 1A is a block diagram of some hardware components and interconnections in a wireless packet data network.

FIG. 1A—Overall Network Diagram

FIG. 1A illustrates a highly simplified model of an exemplary wireless packet data network 100. This network includes features that are useful, for example, to enable mobile stations to receive e-mail, surf the Internet, and exchange other such "packet data." In this respect, the wireless packet data network 100 may include features of TIA standard IS-835. Additionally, the network 100 may conduct wireless voice calls according to TIA standard IS-95/IS-2000, many variations and revisions of which are known in the art. The IS-95 standard utilizes code division multiple access (CDMA) modulation techniques to conduct wireless conduct voice calls with greater capacity and more robust performance than earlier wireless telecommunications technologies.

Although the particular examples of IS-95/IS-2000 (for voice calls) and IS-835-B/C (for packet data) are utilized to thoroughly illustrate one example, ordinarily skilled artisans with the benefit of this disclosure will recognize many principles of this disclosure that are also applicable in other wireless networks, such as W-CDMA, GSM, GPRS, etc.

The network 100 includes various mobile stations such as 114, which comprise CDMA compatible wireless telephones, which may also be referred to as "access terminals" or "subscriber stations." The mobile stations are capable of conducting transmitting and receiving packet data, and more particularly, packet data for which services have been prepaid as described in IS-835-C. The mobile stations may also be capable of conducting voice calls by transmitting and receiving IS-95 type voice information. Some exemplary mobile stations include mobile telephones, personal communication system (PCS) devices, or other wireless subscriber equipment such as the fixed wireless terminals (FWTs).

Mobile stations 114 are served by various base stations 110, which exchange voice and/or packet data content with the mobile stations 114. In the wireless *voice* telephone context, telephone calls and other voice communications are conducted by exchanging data between mobile stations 114 and base stations 110 via radio frequency (RF) electromagnetic signal channels such as 112a. Base stations 110 may also exchange other types of information with the mobile stations 114, such as call paging messages, origination messages, registration messages, pilot signal reports, and other digital data. As for packet *data*, these communications are conducted by exchanging internet protocol (IP) packet data between mobile stations 114 and base stations 110 for relay to the Internet 101 or some other packet data network (not shown) such as a corporate network. Examples of packet data include internet protocol (IP) datagrams used for such applications as accessing web pages, retrieving e-mail, etc. Such packet data applications may run directly on the mobile stations 114, or may run on a separate computer device that uses the mobile station 114 as a wireless modem. In the packet data context, IP packet data is conducted between mobile stations 114 and base stations 110 via RF electromagnetic signal channels such as 112b.

Some or all of the base stations 110 may be implemented using hardware such as that used by conventional base stations in commercial use today. Each base station 110 is coupled to a base station controller (BSC) 106, each of which conducts two-way information flow between base stations 110 and various network facilities 104 (described below). The BSCs 106 perform various functions that allow mobile communication to take place, including orchestrating the handoff of mobile stations 114 between base stations. For use in processing packet data, the BSCs include a packet control function (PCF) module to help in exchanging IP data packets with the network facilities 104. Each BSC 106 may be implemented using hardware such as that used by conventional wireless networks in commercial use today, for example.

As mentioned above, the BSCs 106 conduct information between the base stations 110 and the network facilities 104. The network facilities 104, may include components such as a packet data switching nodes (PDSNs), mobile switching centers (MSCs), mobile telephone switching offices (MTSOs), and the like. The PDSN function, as known in the art, is to extract IP packets received via PPP connections with mobile stations, and transmit the IP packets to appropriate Internet destinations; the PDSN also performs a complementary function, in the opposite direction. One function of the MSC is to relay voice stream information between the BSCs 106 and the public switched telephone network (PSTN) 105. The MSC also provides mobility control, call processing, and call routing functionality. The MSC may also route calls to/from other MSCs within and/or outside the network 100.

For use in processing packet data, the network facilities 104 may include one or more foreign agents. In a mobile-IP implementation, the network facilities 104 exchange IP data between the BSCs 106 and one or more home agents 102 via one or more links 103, such as wireless or wire-line T1 or T3 links, fiber optic connections, Ethernet, or other Internet Protocol (IP) connections. The home agent 102, in turn, is coupled to the Internet 101 or any other IP network.

FIG. 1B—Packet Data & Prepaid Service Components

FIG. 1B provides a more detailed illustration of some packet data related components from FIG. 1A. In the network 120, a mobile station 114 is operably coupled to a base station 123, which communicates with the mobile station 114 using a RF electromagnetic over-the-air (OTA) link. The structure and operation of base stations are well known in the relevant art (except for, of course, any unique features introduced by the present disclosure). A BSC 121 and PCF 124 conduct communications between the base station 123 and a PDSN 126. Broadly, and as known in the art, the BSC 121 acts to reassemble and check the integrity of radio link packet (RLP) data arriving from the mobile station via base stations such as 123. The PCF 124 takes data from the BSC 121 in one format (so-called "A8" format) and places the data into another format (so-called "A10" format) for transferring and receiving packet data to/from the PDSN 126. The BSC 121 and PCF 124 also perform the complementary functions in the opposite direction, that is, toward the mobile 114. More particularly, the interface 124a between PCF 124 and PDSN 126 may carry R-P (RN-PDSN) protocol data, where the interface 124a is exemplified by an A10 or A11 interface defined in A.S0011-7-0 v2.0, Interoperability Specification (IOS) for cdma2000 Access Network Interfaces—Part 7 (A10 and A11 Interfaces), May 2002. In embodiments where SMS is implemented, the BSC 121 may additionally be coupled to the MSC 132 via interface 121a for use in relaying SMS data, as explained in greater detail below. The structure and operation of BSCs and PCFs are well known in the relevant art (except for, of course, any unique features introduced by the present disclosure).

The PDSN 126 acts to relay packet data communications between the PCF 124 and the Internet 149 or other targets coupled to the IP network 138 (for example, the home agent 148 in mobile-IP configurations). These communications are conducted via Pi (PDSN—Internet) interface 126a, which is defined by IS-835. The PDSN 126 also communicates with the visited authentication-authorization-accounting (AAA) server 134 for reasons described below. Communications with the visited AAA server 134 also occur over a Pi type interface. The visited AAA server 134 communicates utilizing RADIUS, DIAMETER, or another AAA protocol. The structure and operation of PDSNs are well known in the relevant art (except for, of course, any unique features introduced by the present disclosure).

The MSC 132 is a component that routes incoming voice telephone calls from the public switched telephone network (PSTN), not shown, to the appropriate base station for transmission to the correct mobile station. MSC 132 also controls the routing of calls in the reverse direction, namely, from an originating mobile station via one or more base stations to the PSTN. In addition, MSC 132 may direct intra-network calls between mobile stations units via the appropriate base stations. The structure and operation of MSCs are well known in the relevant art (except for, of course, any unique features introduced by the present disclosure).

A number of home area components 143 are also illustrated. By "home area," what is meant is the service provider's home network to which the subscriber belongs. The home network comprises the subscriber's home AAA server 144, prepaid server (PPS) 146, and (sometimes) the home agent 148. The home area components 143 may further include variety of other components, such as the home location register (HLR) and others whose illustration here is not necessary to the present disclosure.

The home AAA server 144 performs AAA functions for mobile stations, as described for example in the IS-835 standard. The home AAA server 144 may comprise, for example, a RADIUS server, as described in Internet Engineering Task Force (IETF) Request for Comments (RFC) 2138. Accordingly, the structure and operation of AAA entities is well known in the relevant art (except for, of course, any unique features introduced by the present disclosure). The home AAA server 144 is coupled to the IP network 138 by a connection 144a.

Another component of the network 120 is the prepaid server (PPS) 146, which is a software, firmware, and/or hardware component that may be a subcomponent of the home AAA server 144 or a separate component connected by the home AAA server 144 by an appropriate software and/or hardware interface 146b. Thus, the PPS 146 may itself be coupled to the IP network 138 as shown by 146a, or utilize network connection 144a by virtue of the PPS's connection to the home AAA. The PPS 146 performs various AAA functions related to prepaid packet data services, including a prepaid authorization procedure for subscribers that are defined as prepaid users. Broadly, the PPS 146 monitors, updates, and outputs information regarding the identity and status of prepaid packet data service accounts. This authorization procedure includes checking prepaid accounting capability, checking account balance and state, returning prepaid accounting capability to a "prepaid client" (described below) to indicate whether prepaid service is available, etc. Some information about known functions of the PPS 146 is available in the IS-835-C standard. Other functions, unique to the present disclosure, are introduced herein.

The home agent 148 is utilized under a "mobile-IP" embodiment of the network 120. The structure and operation of home agents is well known in the relevant art (except for, of course, any unique features introduced by the present disclosure). The home agent 148 provides an IP address ("home address") for the mobile station 114 to transmit and receive information from the Internet 149. This anticipates the ability of the mobile station by virtue of its mobility, to move about the network 120 or even move into other networks, and receive the same IP addresses irrespective of the visited network's local topology. Thus, the home agent 148 serves as a gateway between mobile stations such as 114 and the Internet 149.

This is achieved, at least in part, by the home agent 148 performing tunneling, namely, receiving IP packets from the Internet 149 directed at the mobile station's home address and tunneling/encapsulating the packets to the foreign agent serving the mobile station in the visited network. The foreign agent in turn un-encapsulates the packets and forwards them to the appropriate mobile station. The foreign agent and home agent may optionally also perform tunneling in the reverse direction (i.e., from foreign agent to home agent). Tunneling and the exact nature of home agents 148 in a packet data services network are well documented in various publications accessible to those of ordinary skill in the relevant art.

Alternatively, the present disclosure also contemplates a network 120 without the home agent 148. This arrangement is referred to as "simple-IP." In this case, a mobile station is assigned a new IP address each time it undergoes handoff to a base station served by a new PDSN, at least momentarily disrupting the mobile station's connectivity to the Internet. In this arrangement, the PDSN 126 forwards packets from the Internet 149 to the mobile station 114's current IP address.

The visited AAA server 134 comprises a local database to cache various data of the home AAA server 144 in order to provide local AAA services in cooperation with the home AAA server 144. Broadly, the visited AAA server 134 provides AAA functionality for mobiles requesting packet data services while outside their home area. Thus, the visited AAA server 134 authorizes, authenticates, and performs accounting functions for visited mobile stations by working together with the home AAA server 144. When a mobile station is in the home network, only the home AAA server serves the mobile station. The visited AAA server 134 may be implemented by a RADIUS server, for example.

The network 120 may additionally include one or more domain name servers (DNS) such as DNS 150. Although multiple DNS units may be provided, FIG. 1B shows the single DNS 150 for ease and clarity of illustration. The DNS 150 may be coupled to the IP network 138, part of the IP network 138, part of the Internet 149, or located in any other suitable location. The DNS 150 provides domain name services, for example, as described in "Internetworking with TCP/IP Volume I, Principles, Protocols, and Architecture," by Douglas E. Comer. Those skilled in the art of the related fields are familiar with the services provided by domain name servers.

The network 120 also includes short message service (SMS) equipment 133. The SMS equipment 133 may include, for example, a message center (MC) to store and forward short messages, and optionally provide supplementary services related to SMS. The SMS equipment 133 may also include other SMS related components, such as a short message entity (SME) to compose/decompose short messages, etc. The SMS equipment 133 is coupled to a number of other network 120 components, including at least the MSC 132 and the home AAA server 144 for purposes of illustrating the present disclosure. The structure, interconnection, and use of SMS equipment is well known to those of ordinary skill in the art (except for, of course, any unique features introduced by the present disclosure).

Exemplary Digital Data Processing Apparatus

Data processing entities such as the components of FIGS. 1A–1B, or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

OPERATION

Having described various structural features, some operational aspects of the present disclosure are now described.

Signal-Bearing Media

Figure 2:
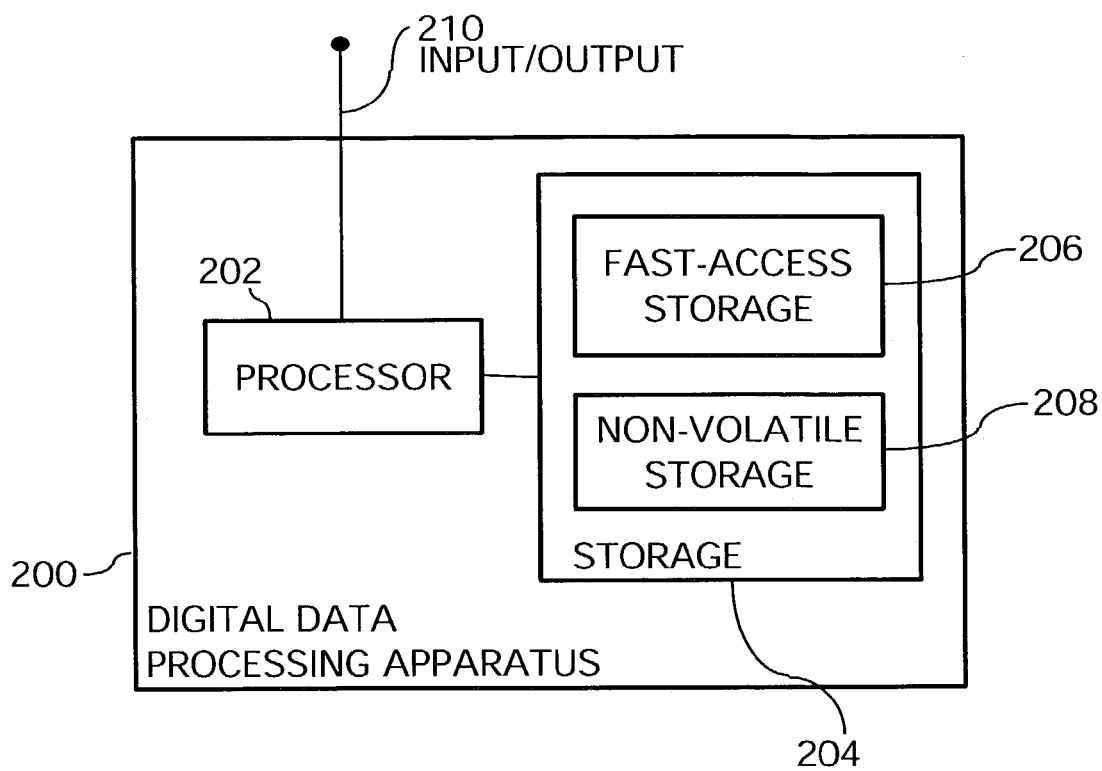
FIG. 2 is a block diagram of an exemplary digital data processing machine.
Figure 3:
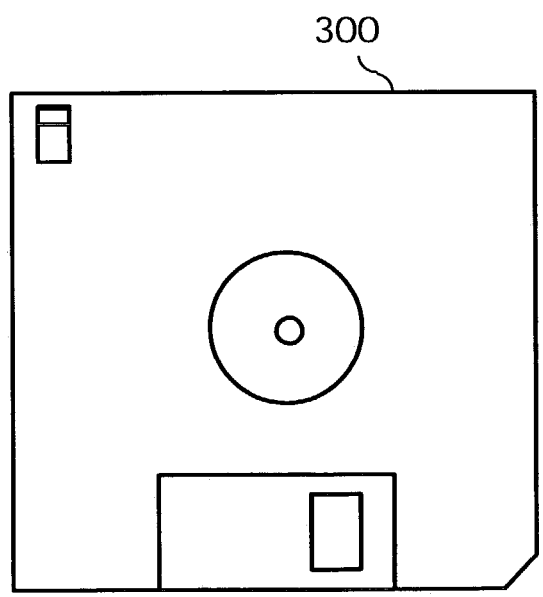
FIG. 3 is a plan view of an exemplary signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Introduction to Prepaid Packet Data Service

Prepaid packet data service allows an end-user (also referred to as a "subscriber" or a "customer") to purchase packet data service based on data volume or time. The prepaid user purchases credit for using packet data service and the credit balance is stored and maintained in the PPS 146. In one implementation, the credit is translated into a set of coupons that are sent, one by one, to an entity that assists the mobile in managing prepaid data service use. This entity is called a "prepaid client" because it interacts with the PPS 146 on behalf of the mobile station 114 to obtain service, balance coupons, and/or other information from the PPS 146. In one embodiment of mobile-IP, the prepaid client is the home agent 148, and in another embodiment, the prepaid client is the PDSN 126. In one embodiment of simple-IP, the prepaid client is the PDSN 126. In other embodiments of mobile-IP and simple-IP, the prepaid client may be present in any other network entity.

Initially, when the prepaid user establishes a packet data session, the prepaid client receives a coupon from the PPS 146. Whenever coupon credit decreases below a threshold, the prepaid client requests another coupon from the PPS 146. This procedure continues until the overall credit balance reaches zero. The coupon exchange between the prepaid client and PPS 146 occurs via the home AAA server 144 and visited AAA server 134 in order to guarantee secure communications.

Additional details of prepaid wireless data services are explained in TIA standard IS-835-C.

Operating Sequence, Generally

Figure 4:
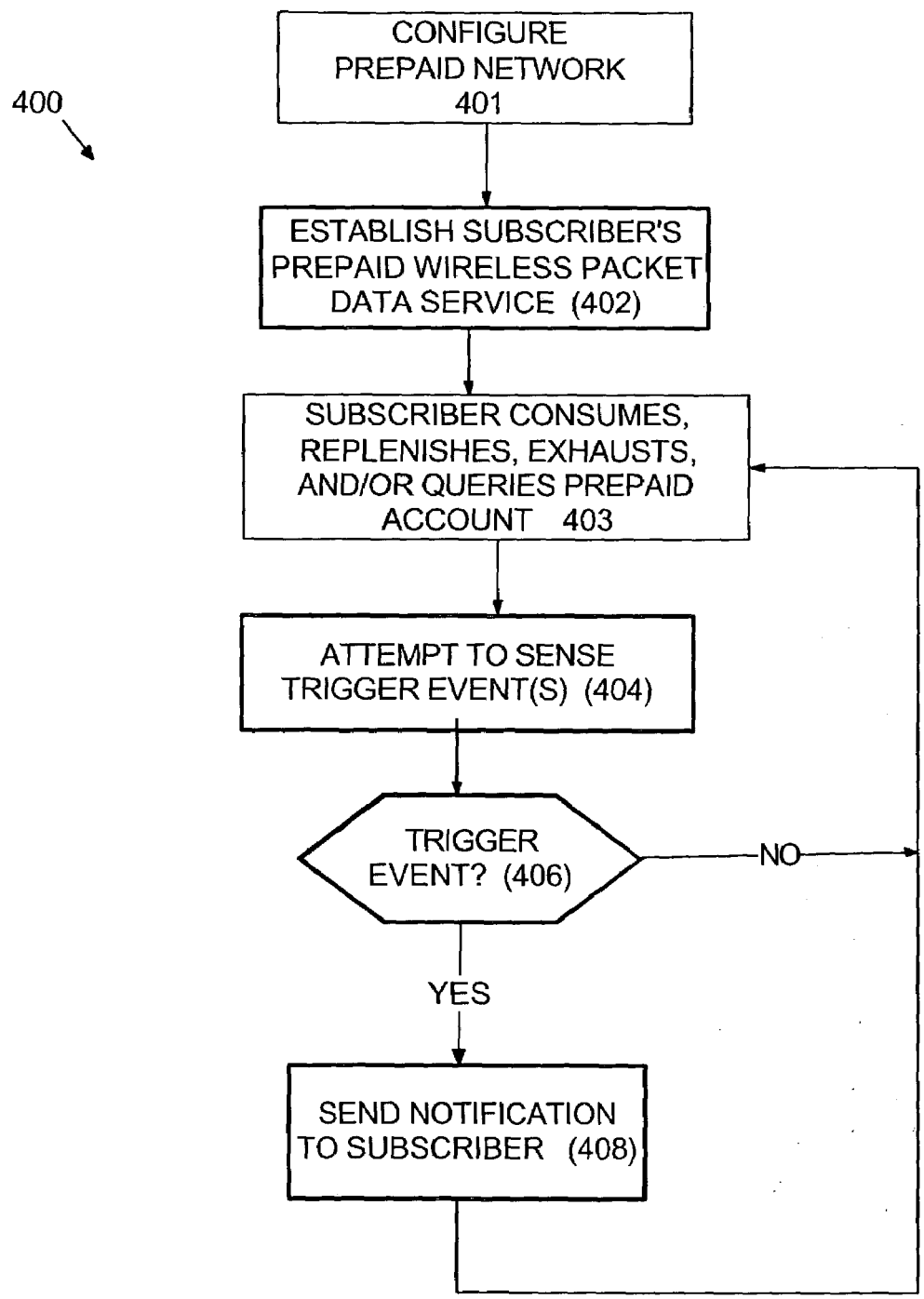
FIG. 4 is a flowchart illustrating an overall sequence for operating a wireless packet data network to provide prepaid packet data service balance notification.

FIG. 4 describes an overall operating sequence 400 for providing subscribers with account balance notification of prepaid wireless packet data services in a wireless packet data network. Without any intended limitation, the sequence 400 is discussed in conjunction with the hardware components of FIG. 1B.

Step 401 configures the prepaid network 120, and in particular, sets the value of various default system parameters. These parameters are discussed in greater detail below in the appropriate context.

Step 402 establishes a customer's prepaid wireless packet data service by creating an account at the PPS 146. For instance, the customer's account may be manually setup at the PPS 146 by a network technician, remotely setup by a wireless service sales agent or service provider interacting with the PPS 146, remotely setup by a customer utilizing an automated teller or telephone or Internet web site to interact with the PPS 146, etc. In this step, the initiating entity enters the identity of the prepaid mobile station and the amount of prepayment into the PPS 146 of the mobile station's home network 143. Additional information may be recorded at the PPS 146, such as the mobile station's electronic serial number (ESN), mobile identification (MID), and other such data. Other details of establishing prepaid service may be achieved as disclosed by IS-835-C.

In step 403, the mobile station consumes, replenishes, exhausts, and/or queries the prepaid account balance. Utilization and management of prepaid packet data services is detailed in IS-835-C.

Step 404 senses various predefined account balance notification "trigger" events. More particularly, these trigger events are sensed by the PPS 146 according to installation, reconfiguration, update, programming, or other configuration of the PPS 146 that previously occurred in step 401.

Some exemplary trigger events are described as follows. One such event occurs when the network, and particularly the prepaid client (represented by the home agent 148 or PDSN 126) or the PPS 146 detects that a mobile station's prepaid account balance falls below a system-specified threshold. The amount of this threshold may be predefined by network or service provider configuration of the home agent 148, PDSN 126, or PPS 146 (step 401), or by input from the operator of the mobile station (step 402).

Another exemplary trigger event is when the network, and particularly the PPS 146, receives an account balance query from a mobile station or prepaid client. In the example of a mobile station generated query, a human operator may enter predefined keystrokes, utterances, display entries, menu items, or other input via her mobile station to submit such an account balance inquiry to the network. Network components forward the balance query to the PPS 146, where the query is executed. Mobile stations' balance queries may be submitted to the PPS utilizing various types of messaging, such as network-architecture-specific (NAS) signaling protocol, short messaging service (SMS), or internet protocol (IP). These techniques are more specifically described below in conjunction with FIGS. 8–10. Queries may also arise, as described below, from the prepaid client.

Still another exemplary trigger event is when the network, and particularly the PPS 146, detects replenishment of the mobile station's prepaid account balance. As one example, account replenishment may occur via one of the initiating entities as discussed above in conjunction with step 401.

In yet another example, trigger events may comprise the arrival of scheduled account balance notification times. These times may occur periodically, semi-periodically, or under another pre-planned time schedule. For this purpose, a system clock, local timer, or other timing device may be used.

After step 404 attempts to sense the predefined account balance notification trigger events, step 406 is performed. Step 406 returns to step 403 if there has not been any trigger event, or proceeds to step 408 if there has been a trigger event. Step 406 is performed by the same entity as step 404.

When a trigger event is sensed (404, 406), step 408 sends appropriate prepaid balance notification to the customer. For instance, the network 120 may send a message advising the subscriber of her remaining prepaid balance in dollars, minutes, or another convenient unit. This may be accomplished by various types of messaging, such as NAS signaling protocol, short messaging service (SMS), or application/internet protocol (IP). These techniques are more specifically described below in conjunction with FIGS. 5–7. The type of communications used in step 408 depends upon the manner in which the network is deployed, that is, a decision made at the time the network is implemented or otherwise configured.

After notifying the customer of her prepaid balance in step 408, the routine 400 returns to step 403.

In the foregoing description of the sequence 400, as well the following description of other sequences, various interactions between PDSN 126 and PPS 146 and/or home AAA server 144 are described. For ease and brevity of explanation, particular reference to the visited AAA server 134 is not made, even though it is understood that certain messages from the mobile station 114 and/or PDSN 126 may be directed to the PPS 146 via the visited AAA server 134 and home AAA server 144 whenever the subject mobile station 114 is outside its home area. In these situations, the PDSN 126 may direct communications to the visited AAA 134, which in turn negotiates with the PPS 146 via the home AAA server 144 (via interfaces 144a and 146b).

Balance Query

Introduction

Figure 8:
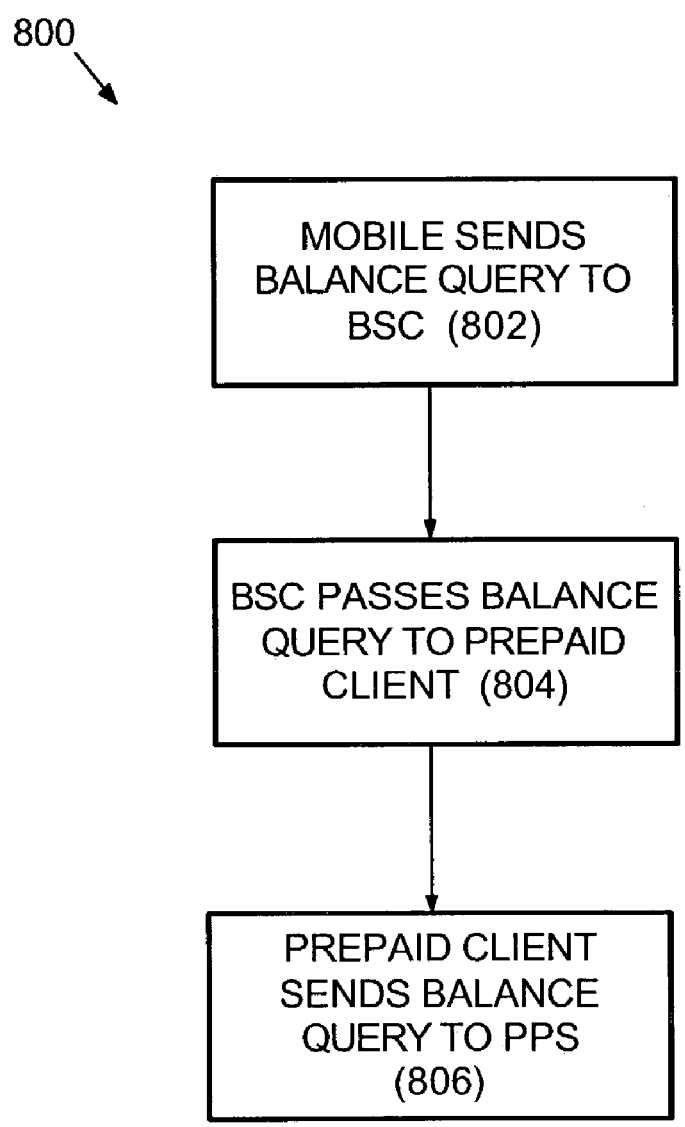
FIG. 8 is a more detailed flowchart illustrating a sequence for subscriber station submission of a balance query utilizing NAS signaling.
Figure 9:
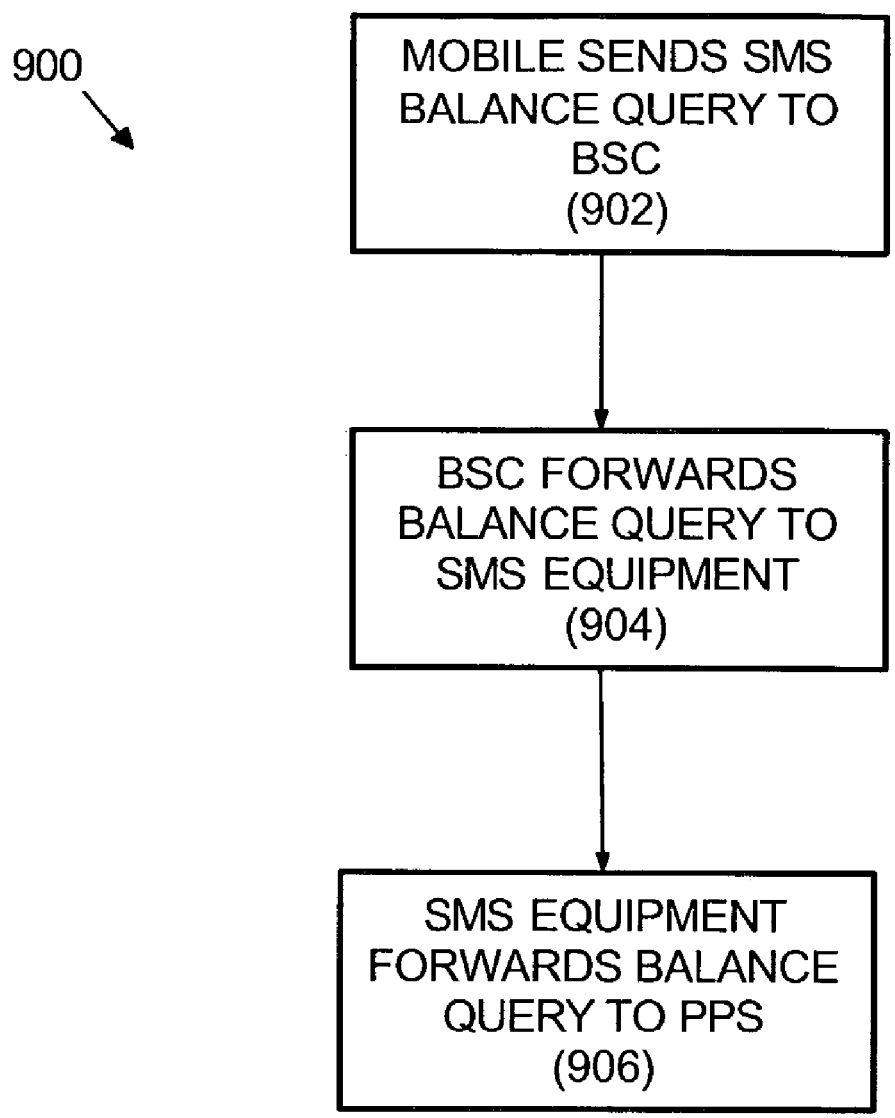
FIG. 9 is a more detailed flowchart illustrating a sequence for subscriber station submission of a balance query utilizing SMS protocol.

As mentioned above, one potential event that may occur in step 403 (FIG. 4) is when a mobile station submits a balance query. FIGS. 8–10 show some exemplary techniques by which this may occur. Examples of NAS messaging, SMS, and application/IP communications are discussed.

Detailed Sequence: Balance Query Using NAS Signaling

As mentioned above, one exemplary technique for mobile stations to submit balance queries in step 403 (FIG. 4) involves NAS signaling. Generally, NAS signaling refers to signaling utilizing communications particular to the interfaces, interconnection, and other infrastructure of the network. One example of NAS signaling is IS-2000 compatible signaling, which is utilized in a CDMA-2000 network such as the network 120 of FIG. 1B. Accordingly, FIG. 8 shows a sequence 800 by which a mobile station submits balance query utilizing IS-2000 as a representative example of NAS signaling. Broadly, in this sequence 800, the balance query is delivered from the mobile station 114 to the PPS 146 by sequentially addressing and then delivering the information to various network entities using IS-2000 communications until the information arrives at the PPS 146.

In step 802, the mobile station 114 sends a balance query to the BSC 121 utilizing over-the-air communications ("OTA signaling"). In step 804, the BSC 121 passes the balance query to the prepaid client. In one embodiment, the prepaid client is the home agent 148, in another embodiment, the PDSN 126. In the embodiment where the prepaid client is the home agent 148, step 804 involves the BSC 121 forwarding the message to the PCF 124 via A9 interface, the PCF 124 sending the message to the PDSN 126 via A11 interface, and the PDSN 126 sending the balance query to the home agent 148 via Mobile-IP message. In the event the PDSN 126 is the prepaid client, step 804 involves the BSC 121 and PCF 124 forwarding the balance query to the PDSN 126 utilizing A9/A11 signaling.

In step 806, the prepaid client sends the balance query to the PPS 146 utilizing a RADIUS protocol message, completing the sequence 800.

The foregoing sequence utilizes IS-2000 signaling, as was illustrated in the context of the CDMA-2000 network 120. Of course, in other types of networks, balance queries are submitted (step 403, FIG. 4) using analogous but technically different means of NAS signaling. For example, in a GSM network, balance queries are relayed by GPRS messages; in a W-CDMA system, balance query is carried out utilizing universal mobile telecommunications system (UMTS) communications. More particularly, under GPRS or UMTS, mobile stations submit balance queries as follows.

First, the mobile transmits a balance query to a radio network controller (RNC) using a GSM or W-CDMA type OTA link, as applicable. Then, the RNC forwards the message to a serving GPRS support node (SGSN) utilizing an interface such as Iups (for UMTS) or Gb (for GPRS). The SGSN sends the message to a prepaid client such as a gateway GPRS service node (GGSN) over an interface such as Gp (if GGSN and SGSN are in the same carrier) or Gn (if GGSN and SGSN are in different carriers), as applicable. The prepaid client then forwards the balance query to the visited or home AAA utilizing RADIUS protocol, for example.

Detailed Sequence: Balance Query Using SMS

As mentioned above, another exemplary technique for mobile stations to submit balance queries in step 403 (FIG. 4) involves SMS messaging, which may be utilized in any network configuration with SMS capability, such as a CDMA-2000 network (such as 120), GSM network, W-CDMA network, etc. FIG. 9 shows a sequence 900 by which a mobile station submits balance query utilizing SMS. Broadly, in this sequence 900, the balance query is delivered from the mobile station 114 to the PPS 146 via SMS messages. In this embodiment, the PPS 146 is defined as an entity (as with mobile phones and other destinations) to which SMS messages can be directed.

In step 902, the mobile station 114 sends an SMS format balance query message to the BSC 121. In step 904, the BSC forwards the message to the SMS equipment 133 via the MSC 132 and interface 121*a*. The SMS equipment 133 relays the balance query to the PPS 146 in step 906. More particularly, in step 906, the SMS equipment 133 may forward the SMS balance query message to the home AAA server 144, which in turn passes the query to the PPS 146. The details of step 904 and 906's use of the well known hardware components, interconnections, and functionality of SMS will be apparent to those of ordinary skill in the art (having the benefit of this disclosure). This concludes the sequence 900.

Without undue experimentation, ordinarily skilled artisans having the benefit of this disclosure will also be able to apply the foregoing description of the sequence 900 to implement similar SMS messaging in other, non-CDMA-2000 networks such as GSM, W-CDMA, etc. The hardware components, interconnections, and functionality of SMS in various networks are widely known well documented.

Detailed Sequence: Balance Query Using Application/IP

As mentioned above, one exemplary technique for mobile stations to submit balance queries in step 403 (FIG. 4) involves application/IP communications. For purposes of illustration, FIG. 10 illustrates a sequence 1000 that utilizes application/IP communications to convey a mobile station's balance query message in a CDMA-2000 system 120. Broadly, in this sequence 1000, the mobile transmits its balance query directly to the PPS 146 utilizing application/IP communications. "Application/IP" as used herein refers to communications whereby (1) messages are relayed among network components according to the IP address of the destination, (2) contents of the messages are divided, routed, reassembled, error-corrected, and otherwise processed by transmission control protocol (TCP) or another packet management layer, and (3) content of the messages are processed by at the sender and receiver's end by respective, inter-compatible "application" programs. Ordinarily skilled artisans (having the benefit of this disclosure) will recognize that, when client-server applications are utilized, the client application will be aware of the server application's transport port number.

In step 1002, the mobile station 114 sends an application/IP message containing a balance query to the IP address of the PPS 146. The PPS 146's IP address may be available to the mobile 114, for example, by earlier pre-programming of the IP address into storage of the mobile 114, performing a DNS query, etc. The balance query message comprises a prepaid service application layer protocol message utilizing IP protocol suite.

In step 1004, the balance query message travels the network via applicable connecting components as needed to route the application/IP message to the PPS 146 (e.g., base station 123, BSC 121, PCF 124, PDSN 126, etc.) Unlike the sequence 800 (FIG. 8), the mobile station does not specifically address the balance notification to the PDSN 126 or any other intermediate, upstream components, since the PPS 146's actual IP address is utilized. The message is delivered to the PPS 146 via IP network 138 without requiring participation of the visited AAA server 134 or home AAA server 144.

Balance Query By Prepaid Client

Another potential event that may occur in step 403 (FIG. 4) is when a prepaid client (such as PDSN 126) submits a balance query on behalf of a mobile station. The prepaid client may submit a balance query under various circumstances, depending upon the needs of the application. For example, the prepaid client may submit a balance query for a mobile station each time the mobile utilizes a prescribed volume of packet data, on a prescribed time schedule, in response to passing a final balance coupon (prior to balance exhaustion) to the mobile, etc.

In the case of the PDSN 126, it submits the balance query to the home AAA server 144 (or visited AAA server 134) utilizing NAS signaling, such as IS-2000 in the case of a CDMA-2000 network. Content of the PDSN 126's message utilizes AAA-compatible protocol such as RADIUS, DIAMETER, etc.

Balance Notification

Introduction

Figure 5:
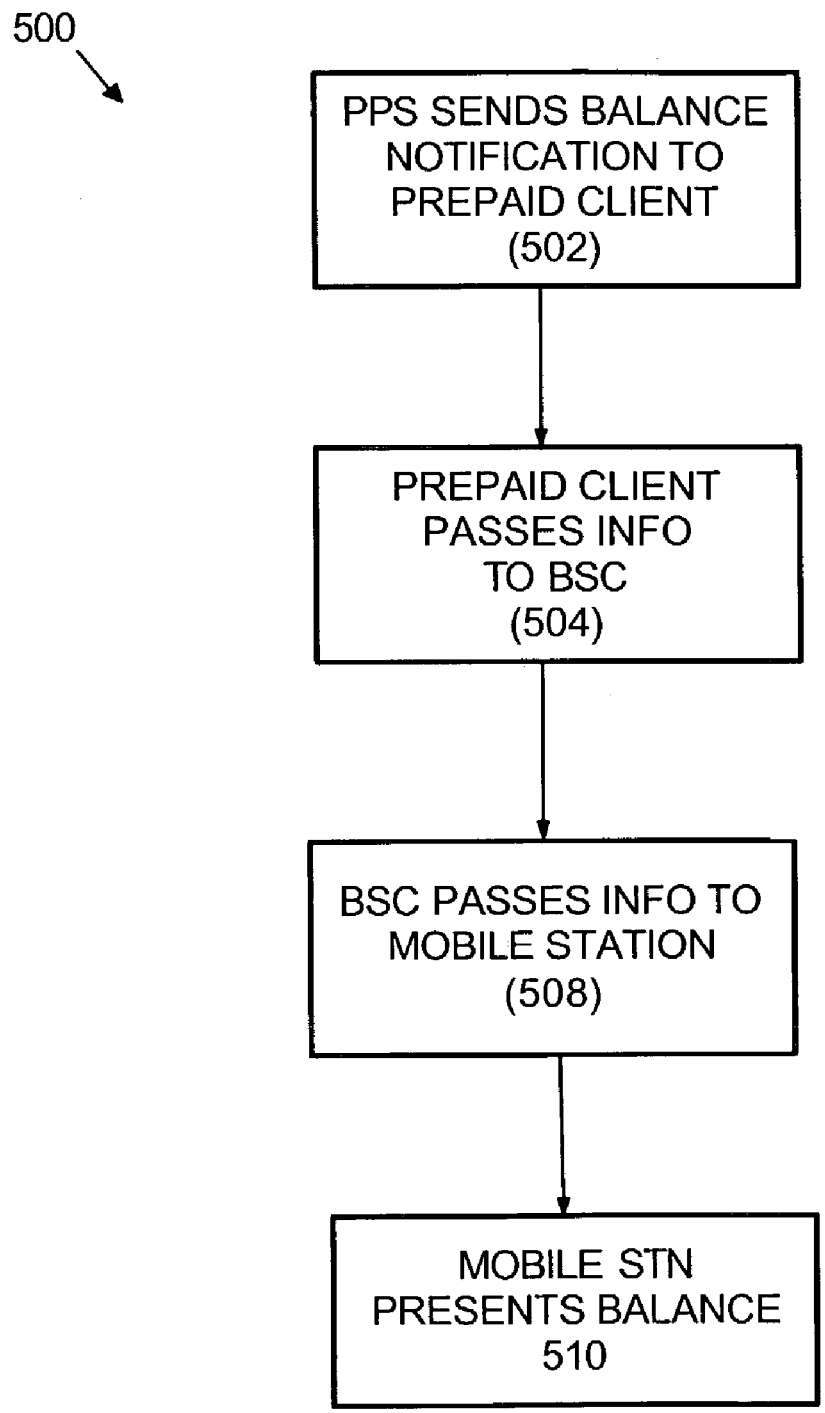
FIG. 5 is a more detailed flowchart illustrating a sequence for providing balance notification utilizing NAS signaling.
Figure 6:
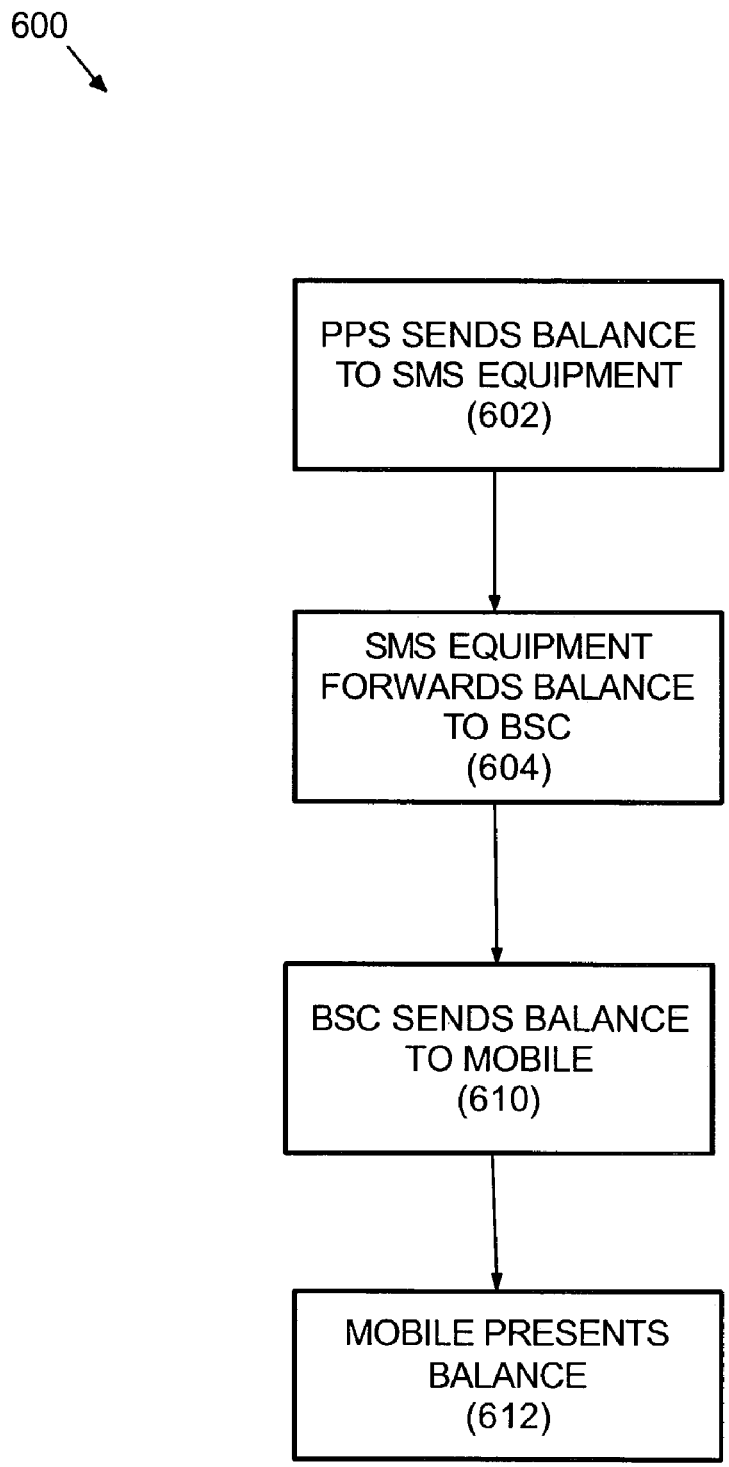
FIG. 6 is a more detailed flowchart illustrating a sequence for providing balance notification utilizing short messaging service (SMS) protocol.
Figure 7:
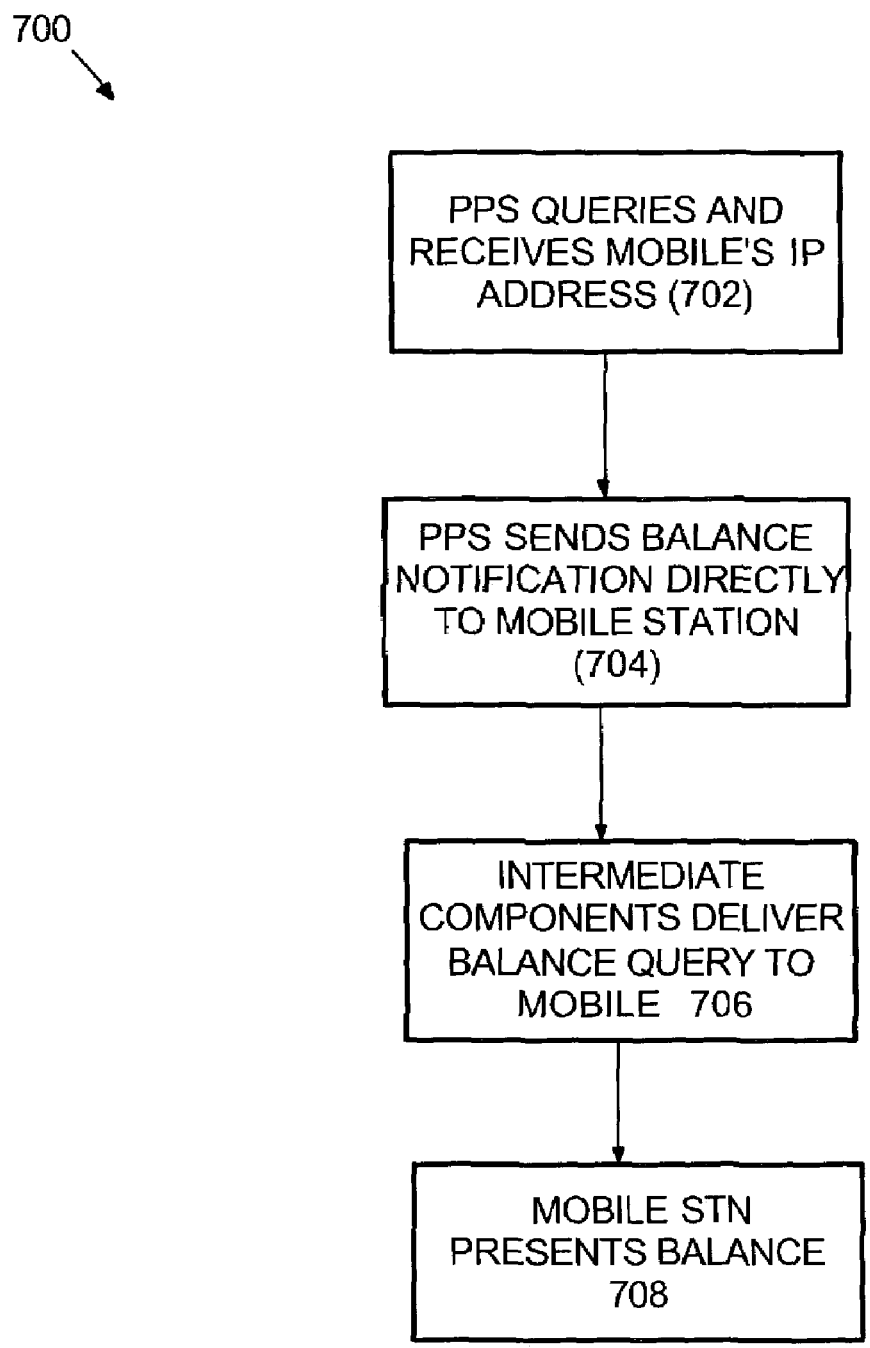
FIG. 7 is a more detailed flowchart illustrating a sequence for providing balance notification utilizing application/IP communications.

FIGS. 5–7 show some exemplary techniques to convey the balance notification of step 408 (FIG. 4). Examples of NAS messaging, SMS, and application/IP communications are discussed.

Detailed Sequence: Balance Notification Using NAS

As mentioned above, one exemplary technique for providing customers with prepaid account balance notification in satisfaction of step 408 (FIG. 4) involves NAS signaling. One example of NAS signaling is IS-2000 compatible signaling, which is utilized in a CDMA-2000 network such as the network 120 of FIG. 1B. Accordingly, FIG. 5 shows an example of balance notification utilizing NAS signaling utilizing the particular example of IS-2000 signaling.

Broadly, in this sequence 500, the account balance notification is delivered from the PPS 146 to the mobile station 114 by sequentially addressing and then delivering the information to various network entities using IS-2000 communications until the information arrives at the mobile station.

In step 502, the PPS 146 sends the balance notification to the prepaid client utilizing RADIUS protocol. In one embodiment, the balance notification comprises a balance amount, such as $23.50. In another embodiment, the balance notification comprises a so-called "coupon," which comprises a prescribed portion of the remaining balance (such as $5), where the PPS 146 releases such portions one by one. Such coupons are described by the IS-835-C publication mentioned above. In still another embodiment, the balance information of step 502 may include both balance amount and coupon.

In step 504, the prepaid client passes the balance notification to the BSC 124. In one embodiment, the prepaid client of step 502 is the home agent 148, in another embodiment, the PDSN 126. In the embodiment where the prepaid client is the home agent 148, step 504 involves the home agent 148 sending the balance notification to the PDSN 126 via Mobile-IP message. Then, the PDSN 126 forwards the balance notification to the PCF 124 and BSC 121 via A11 and A9 signaling. In the event the PDSN 126 is the prepaid client, step 504 involves the PDSN 126 forwarding balance notification to the PCF 124 and BSC 121 via A11 and A9 signaling, respectively.

In step 508, the BSC 121 passes the balance notification to the mobile station 114 via BS 123, which utilizes OTA signaling to deliver the message to the mobile station 114.

Upon receiving this information, the mobile station 114 presents the prepaid account balance and/or coupon information to its operator (step 510). Presentation may involve visual display on a liquid crystal diode (LCD) screen, for example, and/or voice or other audio presentation.

The foregoing sequence utilizes IS-2000 signaling, appropriate to the CDMA-2000 network 120. Of course, in other types of networks, balance notification (step 408, FIG. 4) is carried out using analogous but technically different means of NAS signaling. For example, in a GSM network, balance notification is carried out utilizing general packet radio service (GPRS) messages; in a W-CDMA system, balance notification is carried out utilizing universal mobile telecommunications system (UMTS) communications. More particularly, under GPRS or UMTS, balance notification according to the present disclosure is carried out as follows. Initially, an AAA server transmits a balance notification and/or coupon to a prepaid client such as a GGSN, utilizing RADIUS or another suitable protocol. Then, the GGSN forwards the balance notification to an SGSN over an interface such as Gp (if GGSN and SGSN are in the same carrier) or Gn (if GGSN and SGSN are in different carriers), as applicable. The SGSN forwards the balance notification to a RNC utilizing an interface such as Iups (for UMTS) or Gb (for GPRS). The RNC passes the balance information to the mobile station, utilizing a GMS or W-CDMA over-the-air link, as applicable. Ultimately, the mobile station presents the balance to the user.

Detailed Sequence: Balance Notification Using SMS

To illustrate a different exemplary technique for providing customers with prepaid account balance notification in satisfaction of step 408 (FIG. 4), the sequence 600 (FIG. 6) utilizes SMS communications. Without any intended limitation, the sequence 600 is explained in the context of the system 120 of FIG. 1B.

SMS is a widely accepted wireless service that enables the transmission of alphanumeric messages between mobile subscribers and external systems such as electronic mail, paging and voice mail systems. As SMS is already well known to ordinarily skilled artisans in the relevant art, the protocols, interfaces, formats, and other communications specifics are omitted from the following discussion.

In step 602, the PPS 146 sends a balance notification to the SMS equipment 133, and in particular, to the MC assigned to the subject mobile station 114. In step 604, the SMS equipment 133 sends the balance notification to the BSC 121. As a more particular example in the context of CDMA-2000 system 120, step 604 involves the SMS equipment 133 querying a home location register (HLR) to identify the particular MSC in communication with the mobile station 114, the SMS equipment 133 forwarding the balance notification to the identified MSC 132, and the MSC 132 forwarding the balance notification to the BSC 121.

In step 610, the BSC 121 forwards the balance notification to the mobile station 114, via the appropriate base station 123, using a message of appropriate format. One example is a "data burst" message, a well known means to carry SMS data to mobile stations. Upon receiving this information, the mobile station 114 presents the prepaid account balance and/or coupon information to its operator (step 612).

Without undue experimentation, ordinarily skilled artisans having the benefit of this disclosure will also be able to apply the foregoing description of the sequence 600 to implement similar SMS messaging in other, non-CDMA-2000 networks such as GSM, W-CDMA, etc. The hardware components, interconnections, and functionality of SMS in various networks are widely known and well documented in the art.

Detailed Sequence: Balance Notification Using Application/IP

Another technique for providing customers with prepaid account balance notification in satisfaction of step 408 (FIG. 4) is implemented using application/IP messaging. FIG. 7 shows one example in the form of the sequence 700. Without any intended limitation, the sequence 700 is explained in the context of the system 120 of FIG. 1B. Unlike NAS signaling (FIG. 5), where balance notification is sequentially addressed and then delivered to different network entities until reaching the mobile station, this sequence delivers the information directly by utilizing application/IP messages. "Application/IP" is herein refers to communications whereby (1) messages are relayed among network components according to the IP address of the destination, (2) contents of the messages are divided, routed, reassembled, error-corrected, and otherwise processed by transmission control protocol (TCP) or another packet management layer, and (3) content of the messages are processed by at the sender's and receiver's end by compatible "application" programs.

In step 702, the PPS 146 queries the DNS 150 for the mobile station 114's IP address, so that the PPS 146 can send the balance notification directly to the mobile station 114. In one embodiment, the PPS 146 may query one DNS 150, which in turn queries as many other DNS entities as needed to obtain the mobile station's IP address. In another embodiment, the PPS 146 queries as many DNS entities as needed to find the desired address. An example of these queries utilizes DNS protocol, the nature, syntax, and use of DNS queries are all well known in the relevant art. Also in step 702, the PPS 146 receives the mobile's IP address from the DNS 150.

In another example, the PPS 146 queries another entity with access to the mobile station 114's IP address. For example, the PPS 146 may query the home AAA server 144 to obtain the mobile's IP address. The PPS 146 may in other cases query the prepaid client or examine a message previously received from the prepaid client, for example, if the prepaid client, mobile station, or other source has initiated a balance query or other IP message to the PPS 146. Such a message would presumably contain the mobile's IP address.

After step 702, the PPS 146 sends the balance notification (step 704) directly to the mobile station's IP address. The PPS 146's balance notification comprises a prepaid service application layer protocol message utilizing IP protocol suite. The prepaid client comprises the PDSN 126 or the home agent. The message travels (706) through various network components, e.g., home agent 148 (for mobile-IP), PDSN 126, PCF 124, BSC 121, etc. To these components, however, the contents of the message are transparent. Unlike the sequence 500 (FIG. 5), the balance notification message is not specifically addressed to any intermediate, downstream components, since the mobile's actual IP address is utilized.

Upon receiving this information, the mobile station 114 presents (708) the prepaid account balance and/or coupon information to its operator.

OTHER EMBODIMENTS

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method for providing account balance notification of prepaid wireless packet data services in a wireless packet data network, comprising:
   detecting occurrence of predefined trigger events;
   responsive to occurrence of any one of the predefined trigger events in conjunction with a given wireless subscriber station, sending a balance notification to an internet protocol (IP) address of the given subscriber station via the network, wherein said IP address of the given subscriber station is obtained by querying at least one prescribed entity.

2. The method of claim 1, where the operation of detecting occurrence of predefined trigger events comprises one or more components of the network sensing occurrence of one or more of the following events:
   the given subscriber station's account balance falling below a network-specified threshold;
   the given subscriber station's account balance falling below a subscriber station-specified threshold;
   receipt of an account balance query from the given subscriber station;
   receipt of an account balance query from a component of the network;
   replenishment of the given subscriber station's account balance;
   arrival of a scheduled account balance notification time.

3. The method of claim 1, the sending operation comprising:
   relaying the balance notification to the given subscriber station via the network utilizing network-architecture-specific signaling.

4. The method of claim 1, where:
   the wireless packet data network includes at least one prepaid server, at least one prepaid client, at least one packet control function module, and at least one base station controller;
   the sending operation comprises:
   the prepaid server sending data representative of the balance notification to the prepaid client utilizing authentication-authorization-accounting (AAA) protocol;
   the prepaid client sending data representative of the balance notification to the packet control function module utilizing A11 protocol;
   the packet control function module sending data representative of the balance notification to the base station controller utilizing A11 protocol;
   the base station controller sending data representative of the balance notification to the given subscriber station utilizing a prescribed over-the-air (OTA) protocol.

5. The method of claim 1, where the operations further comprise:
   the given subscriber station submitting a balance query to a prepaid server;

the operation of detecting occurrence of predefined trigger events includes the prepaid server sensing receipt of the balance query.

6. The method of claim 5, where:
the submitting operation comprises the given subscriber station sending a balance query to a prepaid server utilizing one of the following communication modes: network-architecture-specific signaling, short message service (SMS), application/internet protocol (IP) messaging.

7. The method of claim 1, where the operations further comprise:
a prepaid client submitting a balance query to a prepaid server on behalf of the given subscriber station;
the operation of detecting occurrence of predefined trigger events includes the prepaid server sensing receipt of the balance query.

8. A signal bearing medium tangibly embodying a program of machine-readable instructions executable by a digital data processor to perform operations of providing account balance notification of prepaid wireless packet data services in a wireless packet data network, the operations comprising:
detecting occurrence of predefined trigger events;
responsive to occurrence of any one of the predefined trigger events in conjunction with a given wireless subscriber station, sending a balance notification to an internet protocol (IP) address of the given subscriber station via the network, wherein said IP address of the given subscriber station is obtained by querying at least one prescribed entity.

9. The medium of claim 8, where the operation of detecting occurrence of predefined trigger events comprises one or more components of the network sensing occurrence of one or more of the following events:
the given subscriber station's account balance falling below a network-specified threshold;
the given subscriber station's account balance falling below a subscriber station-specified threshold;
receipt of an account balance query from the given subscriber station;
receipt of an account balance query from a component of the network;
replenishment of the given subscriber station's account balance;
arrival of a scheduled account balance notification time.

10. The medium of claim 8, the sending operation comprising:
transmitting the balance notification to the network for delivery to the given subscriber station utilizing network-architecture-specific signaling.

11. The medium of claim 8, where:
one of the predefined trigger events comprising receiving a balance query;
the receiving operation comprising receiving the balance query via one of the following communication modes: network-architecture-specific signaling, short message service (SMS), application/internet (IP) protocol messaging.

12. An apparatus for providing account balance notification of prepaid wireless packet data services in a wireless packet data network, comprising:
means for detecting occurrence of predefined trigger events; and
means for responsive to occurrence of any one of the predefined trigger events in conjunction with a given wireless subscriber station, sending a balance notification to an internet protocol (IP) address of the given subscriber station via the network, wherein said IP address of the given subscriber station is obtained by querying at least one prescribed entity.

13. The apparatus of claim 12, where the detecting occurrence of predefined trigger events comprises one or more components of the network sensing occurrence of one or more of the following events:
the given subscriber station's account balance falling below a network-specified threshold;
the given subscriber station's account balance falling below a subscriber station-specified threshold;
receipt of an account balance query from the given subscriber station;
receipt of an account balance query from a component of the network;
replenishment of the given subscriber station's account balance;
arrival of a scheduled account balance notification time.

14. The apparatus of claim 12, further comprising:
means for relaying the balance notification to the given subscriber station via the network utilizing network-architecture-specific signaling.

15. The apparatus of claim 12, where:
the wireless packet data network includes at least one prepaid server, at least one prepaid client, at least one packet control function module, and at least one base station controller;
the sending operation comprises:
the prepaid server sending data representative of the balance notification to the prepaid client utilizing authentication-authorization-accounting (AAA) protocol;
the prepaid client sending data representative of the balance notification to the packet control function module utilizing A11 protocol;
the packet control function module sending data representative of the balance notification to the base station controller utilizing A11 protocol;
the base station controller sending data representative of the balance notification to the given subscriber station utilizing a prescribed over-the-air (OTA) protocol.

* * * * *

UNITED STATES PATENT AND TRADEMARK OFFICE
CERTIFICATE OF CORRECTION

PATENT NO. : 6,990,330 B2
APPLICATION NO. : 10/340136
DATED : January 24, 2006
INVENTOR(S) : Veerepalli et al.

It is certified that error appears in the above-identified patent and that said Letters Patent is hereby corrected as shown below:

On the title page item (74) replace "George J. Oehlin" with --George J. Oehling--.

Signed and Sealed this

Twentieth Day of February, 2007

JON W. DUDAS
*Director of the United States Patent and Trademark Office*